(12) United States Patent
Schultz et al.

(10) Patent No.: US 11,524,324 B2
(45) Date of Patent: Dec. 13, 2022

(54) METHOD FOR PRODUCING A BENT TORSIONAL PROFILE AND TORSIONAL PROFILE

(71) Applicant: BENTELER AUTOMOBILTECHNIK GMBH, Paderborn (DE)

(72) Inventors: Erik Schultz, Paderborn (DE); Rudi Vitalis, Paderborn (DE); Eugen Seibel, Bad Lippspringe (DE); Gil Rodrigues, Villecresnes (FR)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 124 days.

(21) Appl. No.: 16/249,060

(22) Filed: Jan. 16, 2019

(65) Prior Publication Data

US 2019/0217359 A1    Jul. 18, 2019

(30) Foreign Application Priority Data

Jan. 17, 2018    (DE) .......................... 102018100989.5

(51) Int. Cl.
*B21D 7/06*    (2006.01)
*B21D 53/88*    (2006.01)
(Continued)

(52) U.S. Cl.
CPC .............. *B21D 7/06* (2013.01); *B21D 53/88* (2013.01); *B60G 21/05* (2013.01); *B60G 21/051* (2013.01);
(Continued)

(58) Field of Classification Search
CPC .............. B21C 37/0803; B21C 37/155; B23P 2700/14; B60G 2206/8103;
(Continued)

(56) References Cited

U.S. PATENT DOCUMENTS 4,217,970 A    8/1980 Chika
4,739,918 A    4/1988 Stokes et al.
(Continued)

FOREIGN PATENT DOCUMENTS

DE    19653959    2/1998
DE    10054692    5/2002
(Continued)

*Primary Examiner* — Christopher J Besler
(74) *Attorney, Agent, or Firm* — Sheridan Ross PC

(57) ABSTRACT

The invention relates to a method for producing a bent torsional profile comprising the following process steps:
  a) provision of a plate made of planar sheet metal,
  b) reshaping of the plate through the introduction of a bent trough oriented in the longitudinal direction of the plate in a central length portion (6) of the plate at a distance from the front edges of the plate, forming legs between the trough and the longitudinal edges of the plate,
  c) reshaping of the legs in such a manner that an open profile is created,
  d) reshaping of the legs in such a manner that a hollow profile is produced, wherein a longitudinal gap is formed between the two legs over the entire longitudinal extent thereof and wherein an air gap is created between the legs and the trough in the region of the trough,
  e) joining of the two legs over the entire longitudinal gap.

20 Claims, 4 Drawing Sheets

(51) Int. Cl.
  *B60G 21/05* (2006.01)
  *B60B 35/02* (2006.01)
(52) U.S. Cl.
  CPC ......... *B60B 35/02* (2013.01); *B60B 2310/211* (2013.01); *B60B 2310/212* (2013.01); *B60B 2310/302* (2013.01); *B60B 2310/303* (2013.01); *B60B 2310/318* (2013.01); *B60B 2360/102* (2013.01); *B60G 2202/136* (2013.01); *B60G 2206/20* (2013.01); *B60G 2206/202* (2013.01); *B60G 2206/8103* (2013.01)
(58) Field of Classification Search
  CPC ........ B60G 2206/8109; F16C 2220/42; B21D 7/06; B21D 11/10; B21D 53/88; B60B 2310/211
  See application file for complete search history.

(56) References Cited

U.S. PATENT DOCUMENTS

| | | | |
|---|---|---|---|
| 4,750,757 A | 6/1988 | Long | |
| 4,951,962 A | 8/1990 | Tomida et al. | |
| 6,145,271 A | 11/2000 | Kossmeier et al. | |
| 6,523,841 B2 | 2/2003 | Glaser et al. | |
| 6,616,157 B2 | 9/2003 | Christophliemke et al. | |
| 6,758,921 B1 | 7/2004 | Streubel et al. | |
| 8,091,201 B2 | 1/2012 | Johnson et al. | |
| 8,894,080 B2 | 11/2014 | Fukushi et al. | |
| 9,802,235 B2 | 10/2017 | Friesen et al. | |
| 10,052,671 B2 | 8/2018 | Claussen et al. | |
| 2002/0005622 A1 | 1/2002 | Glaser et al. | |
| 2002/0105159 A1 | 8/2002 | Christophliemke et al. | |
| 2003/0044632 A1 | 3/2003 | Schonleber et al. | |
| 2006/0059974 A1 | 3/2006 | Park | |
| 2007/0052194 A1 | 3/2007 | Marchel | |
| 2007/0075518 A1 | 4/2007 | Murata | |
| 2009/0020974 A1 | 1/2009 | Lee | |
| 2011/0212339 A1 | 9/2011 | Binder et al. | |
| 2015/0104717 A1 | 4/2015 | Kim et al. | |
| 2015/0151352 A1 | 6/2015 | Peters et al. | |
| 2017/0066036 A1* | 3/2017 | Bruggenbrock | B21D 53/88 |

FOREIGN PATENT DOCUMENTS

| | | |
|---|---|---|
| DE | 10102759 | 7/2002 |
| DE | 102007002448 | 7/2008 |
| DE | 102007002449 | 7/2008 |
| DE | 102008052554 | 4/2010 |
| DE | 102009031981 | 8/2010 |
| EP | 0752332 | 1/1997 |
| EP | 1036678 | 9/2009 |
| JP | 2001-146110 | 5/2001 |
| JP | 2005-162080 | 6/2005 |
| JP | 2008-169455 | 7/2008 |
| JP | 2010-194611 | 9/2010 |
| WO | WO 2010/043036 | 4/2010 |

* cited by examiner

METHOD FOR PRODUCING A BENT TORSIONAL PROFILE AND TORSIONAL PROFILE

CROSS-REFERENCE TO RELATED APPLICATIONS

This application claims the benefit of German Application No. DE 10 2018 100 989.5 filed Jan. 17, 2018, the entire contents of which are incorporated herein by reference.

FIELD

The invention relates to a method for producing a bent torsional profile and also a bent torsional profile of this kind.

BACKGROUND

Bent torsional profiles can be used in, among other things, axle systems in four-wheel-drive motor vehicles, in which a twist-beam axle is to be used. The use of bent torsional profiles is appropriate in this case, as it means that the space required for the installation of modules assigned to the drive train in the region of the axle system, or of the torsional profile, can be made available.

Torsional profiles of this kind are already known in a multiple forms. It is already known from EP 2 020 314 A1 and EP 2 310 217 B1 for bent torsional profiles to be used. These torsional profiles are made from a tubular semi-finished product that is bent accordingly and reformed in a U-, V-, L- or X-shape in a center length region of the torsional profile, wherein, however, walls of the torsional profile come to rest against one another in this region. Torsional profiles produced in this manner have an adequate torsional strength, particularly for applications in the automotive field, which is necessary particularly in safety-relevant regions in the automotive sector for torsional profiles of this kind. However, inherent in torsional profiles of this kind is the aggravating property that unwanted noises are produced under certain circumstances when torsional stress is applied, as the walls of the torsional profile rub against one another in the central length portion at which they come to rest against one another and which can have torsional stress applied. These noises can lie within a frequency range that is unpleasant or possibly even painful to the human ear, which means that torsional profiles of this kind are not suitable for comfortable operation of a motor vehicle.

Special lubricating oils must be used in order to suppress these noises. However, even when lubricating oils of this kind are used, noise generation cannot be precluded entirely, as process-related issues mean that wrong doses of the lubricating oil can occur.

These noise problems are also known in the case of torsional profiles which are produced from plates made of sheet metal and have a straight, so not a bent, profile. In this case, however, measures were taken during the reshaping of the plates which prevent the walls from rubbing against one another by introducing an air gap over the entire longitudinal extent of the torsional profile, so that no disturbing noises can occur. Torsional profiles of this kind made of sheet metal plates are known from DE 10 2015 114 943 A1 and DE 10 2014 109 680 A1. However, torsional profiles of this kind cannot simply be bent from plates made of sheet metal, as then the air gap that has been introduced closes again, at least sectionally, leaving walls able to rub against one another again, which can in turn result in disturbing noise generation.

SUMMARY

The problem addressed by the invention is therefore that of providing a method for producing a bent torsional profile and also a torsional profile in which unwanted noise generation does not occur.

This problem is solved according to the method by a method having all the features of patent claim 1. In relation to the torsional profile, the problem is solved by a torsional profile having all the features of patent claim 11. Advantageous embodiments of the invention are found in the dependent claims.

The method according to the invention for producing a bent torsional profile comprises the following process steps in this case:
 a) provision of a plate made of planar sheet metal,
 b) reshaping of the plate through the introduction of a bent trough oriented in the longitudinal direction of the plate in a central length portion of the plate at a distance from the front edges of the plate, forming legs between the trough and the longitudinal edges of the plate,
 c) reshaping of the legs in such a manner that an open profile is created,
 d) reshaping of the legs in such a manner that a hollow profile is produced, wherein a longitudinal gap is formed between the two legs over the entire longitudinal extent thereof and wherein an air gap is created between the legs and the trough in the region of the trough,
 e) joining of the two legs over the entire longitudinal gap.

The sheet-metal plate to be provided may, in this case, have all the possible contours. In particular, the plate may also be rectangular in design wherein, however, the longitudinal edges of the plate still have to be adapted to the bend or curve of the trough before the final joining. It is advantageous, however, for the plate already to be adapted prior to reshaping with its longitudinal edges to the bend or curve of the trough, so that during the reshaping or bending of the legs, they are roughly the same width over their entire longitudinal extent. By reshaping the legs in the regions adjacent to the front edges of the plate and reshaping the legs in the length portion with the trough in adjustment to the contour of the trough, the longitudinal edges of the bent legs or plate are arranged opposite edge to edge or in overlapping fashion forming a longitudinal gap over their entire longitudinal extent. The reshaping in the end regions of the plate or else of the legs should not be limited to a round, oval or similar geometry in this case. Instead, it should be understood to mean any reshaping, so that the end portions of the profile thereby created can be formed on different components, wherein they are of course configured in a correspondingly torsionally rigid manner.

The invention is characterized in that through the introduction of the air gap between the legs and the trough in the region of the central length portion or else the trough, the bent legs and the delimiting walls of the trough are kept spaced apart. In this way, after the longitudinal edges of the legs or of the plate have been joined, the bent legs and the delimiting walls of the trough are spaced apart in the central length portion which can be torsionally stressed in the case of the torsional profile. In this way, it is possible according to the invention that the bent legs and the delimiting walls no longer rub or slide against one another when torsional stress is applied, which means that noise generation, in particular in frequency ranges that are unpleasant or even painful to the human ear, is effectively avoided.

According to a first advantageous embodiment of the invention, the longitudinal edges of the plate are provided with a bend or curve which corresponds to the bend or curve of the trough. In this way, it is ensured that a joint seam is configured as a straight line which, in the case of the finished, bent torsional profile, is arranged uniformly and straight opposite the lowest point of the trough.

The longitudinal edges of the plate may be provided with a bend or curve in this case before the provision or first reshaping of the plate.

However, it is also possible for the longitudinal edges of the plate to be provided with a bend or curve between process steps b) and c), c) and d) or d) and e).

In method terms, it is particularly advantageous for the plate to be reshaped in process step c) in such a manner that the open profile has a roughly w- or M-shape in the central length portion and a roughly u- or n-shape between the front edges and the trough. In this way, the essential contours for the torsional profile being made are produced during the reshaping of the plate into the open profile, so that when the open profile is further reshaped into the hollow profile, the shape of the torsional profile is predefined by the trough.

In a further advantageous embodiment of the invention, the plate or the open profile is reshaped in process step d) in such a manner that a butt joint or an overlap joint is produced between the two legs on the longitudinal edges, on which the longitudinal gap is formed. The joining of the longitudinal edges of the legs or of the plate or of the hollow profile into the finished torsional profile can then easily take place at this longitudinal gap.

Furthermore, it is advantageous for the plate or else the open profile to be reshaped in process step d) in such a manner that the hollow profile has a roughly V-shape in the central length portion and a roughly O-shape in the portions between the trough and the front edges. The V-shape in the central length portion means that the torsional profile has the desired torsional properties, while the O-shape in the region between the trough and the front edges facilitates an easy attachment of the torsional profile to the modules of a motor vehicle, possibly following a correspondingly simple processing of the torsional profile in the region between the trough and the front edges.

It has proved particularly advantageous for the introduction of the trough to take place by means of deep-drawing and/or stretch-forming and/or embossing-raising. Methods of this kind have already proved satisfactory in the automotive sector and can be used in a process-reliable manner.

In order to achieve the desired torsional properties for the torsional profile, it has proved advantageous for the plate to be made of steel, in particular a high-strength or maximum-strength steel.

The final joining of the two legs over the entire longitudinal gap advantageously takes place by means of welding, soldering, adhesion or by a mechanical joining process, as these methods have likewise been tried-and-tested multiple times and are also process-reliable.

Advantageously, the torsional profile bent according to the invention is still produced using the method according to the invention as previously described.

Further goals, advantages, features and possible applications of the present invention result from the following description of exemplary embodiments with the help of the drawings. In this case, all the features described and/or depicted in illustrations make up the subject matter of the present invention either individually in any meaningful combination, even independently of their combination in the claims or their back-reference.

DETAILED DESCRIPTION

Figure 1:
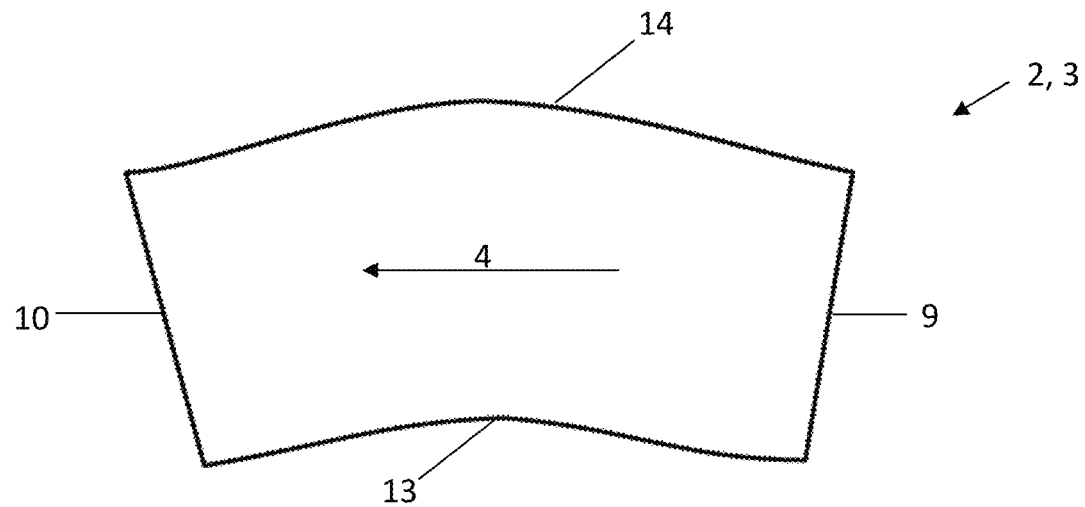
FIG. 1: shows an exemplary embodiment of a plate made of a sheet metal for producing a torsional profile according to the invention in plan view.

FIG. 1 shows an exemplary embodiment of a plate 2 made of sheet metal 3 for producing a bent torsional profile 1 in plan view. The plate 2 in this case has two longitudinal edges 13, 14 arranged substantially parallel to one another and oriented in the longitudinal direction 14 of the plate 2, which are already provided with a bend or curve. This bend or curve substantially corresponds in this case to the bend or curve which should be exhibited by the torsional profile 1 being produced. To this extent, these bends or curves of the longitudinal edges 13, 14 may also be regarded as a curved contour of the plate 2. Alongside the longitudinal edges 13 and 14, the plate still has two front edges 9 and 10 which each run from the one longitudinal edge 13 to the other longitudinal edge 14 and are arranged at an acute angle in respect of one another.

Figure 2:
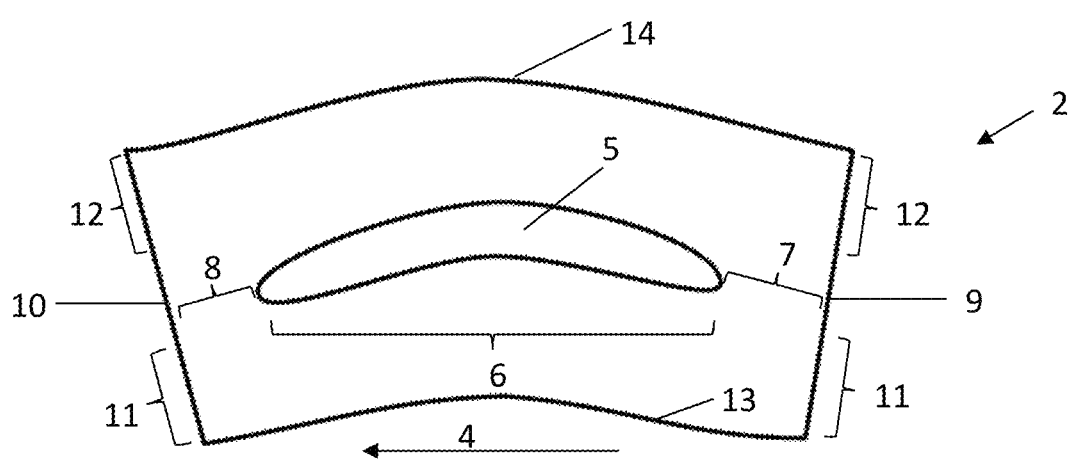
FIG. 2: shows the plate in FIG. 1 with the trough introduced in plan view.

The plate in FIG. 1 is shown in a further plan view in FIG. 2 wherein, however, in a central length portion 6 of the plate 2, a curved trough 5 is already arranged which is arranged in the longitudinal direction 4 of the plate 2 and is at a distance 7, 8 from the respective front edges 9, 10 in each case. The trough 5 is likewise spaced apart from the longitudinal edges 13 and 14, so that between the longitudinal edges 13, 14 and the curved trough 5 a leg 11, 12 is formed in each case. The bend or curve of the trough 5 corresponds as already seen with the bend or curve of the longitudinal edges 13, 14 substantially to the bend or curvature which should be exhibited by the torsional profile 1 being produced.

Figure 3:
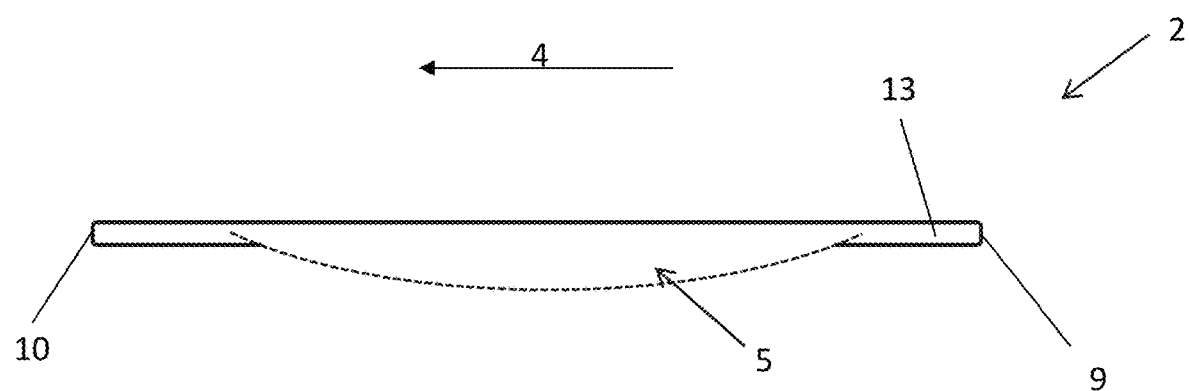
FIG. 3: shows the plate with the trough introduced according to FIG. 2 in side view.

In FIG. 3 the plate 2 provided with the trough 5 in FIG. 2 is shown in side view along its longitudinal extent according to the longitudinal direction 4. The two front edges 9, 10 and also the one longitudinal edge 13 on which the eye directly falls in this representation can clearly be seen here. Likewise clearly shown in this depiction are the distances 7, 8 by which the trough 5 is spaced apart from the front edge 9, 10 in each case.

Figure 4:
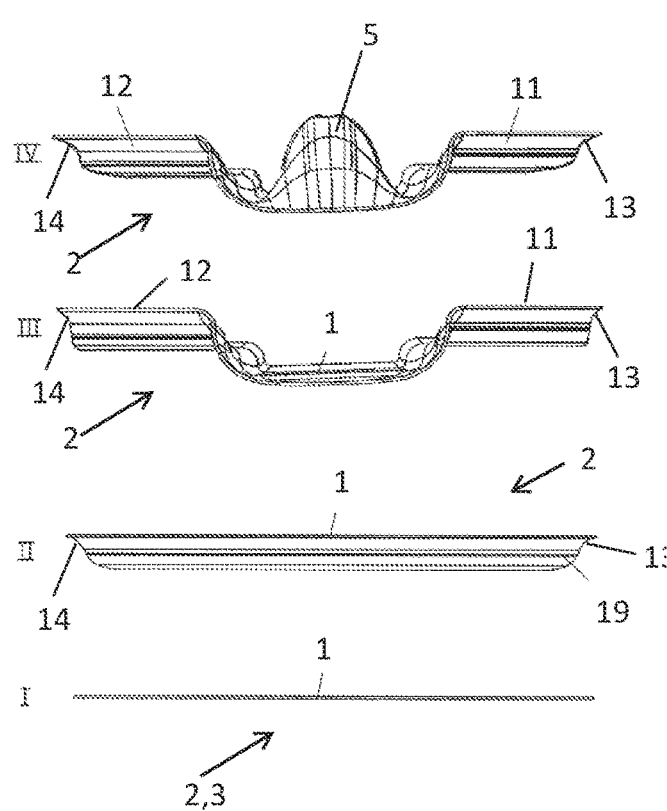
FIG. 4: shows an exemplary embodiment of a method according to the invention for producing a bent torsional profile with seven cross-sectional representations through the plate during different process steps.
Figure 4:
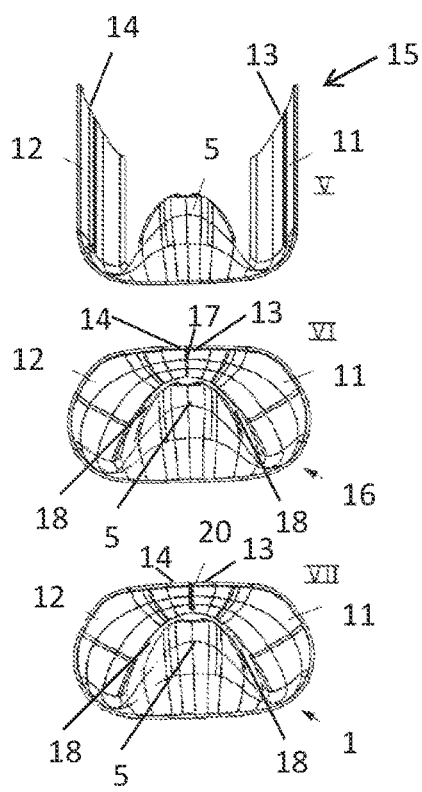

The depiction in FIG. 4 shows seven process steps of an exemplary embodiment for the production of a curved torsional profile 1 in cross-sectional depictions which are labelled using the Roman numerals I to VII.

Starting from the depiction of step I, a planar plate 2 in the form of a planar metal sheet 3 is supplied. The plate 1 in this case is pre-cut to the longitudinal edges 13, 14 and corresponds to the plate 2 shown in FIG. 1.

In step II the plate 2 is reshaped in the region of the two ends between the front edges 9, 10 that cannot be seen here and the central length region 6 in such a manner that a ledge 19 is created in each case. By deep-drawing and/or stretch-forming, the plate 1 is reshaped in such a manner that an open profile 15 with a channel running in the longitudinal direction 4 of the plate 2 is produced, as shown in step III.

In step IV the channel is formed in the counter-direction and has a curved shape which corresponds to that of the curved trough 5 in FIG. 2.

The legs 11, 12 of the plate 2 running alongside the central trough 5 are then reshaped in the direction of the trough 5, as shown in step V.

Following this, the legs 11, 12 of the plate 2 are further reshaped, wherein a hollow profile 16 with a longitudinal gap 17, as depicted in step VI, is created. The air gap 18 between the legs 11, 12 and the walls of the trough 5 can already be identified here, said air gap extending over the entire longitudinal extent of the central length portion 6, through which contact of the legs 11, 12 and the walls of the trough 5 and therefore subsequently noise generation due to the rubbing of the legs 11, 12 against one another and the walls of the trough 5 is prevented.

A closed hollow profile or the completely bent torsional profile 1 is finally produced by welding the longitudinal gap 17 or else the edge butt joint of the legs 11, 12, wherein a weld joint 20 connecting the two legs 11, 12 is produced, as shown in step VII. This depiction also clearly shows the air gap 18 through which contact between the legs 11, 12 and the walls of the trough 5 and therefore a subsequent noise generation through the rubbing of the legs 11, 12 against one another and the walls of the trough 5 is prevented.

Figure 5:
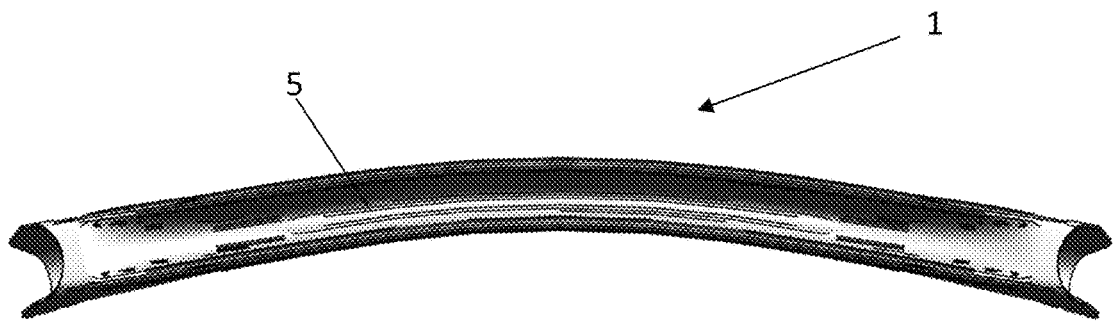
FIG. 5: shows an exemplary embodiment of a torsional profile according to the invention in perspective view

FIG. 5 shows an exemplary embodiment of a bent torsional profile 1 according to the invention in a perspective representation, wherein the trough 5 can clearly be seen.

Figure 6:
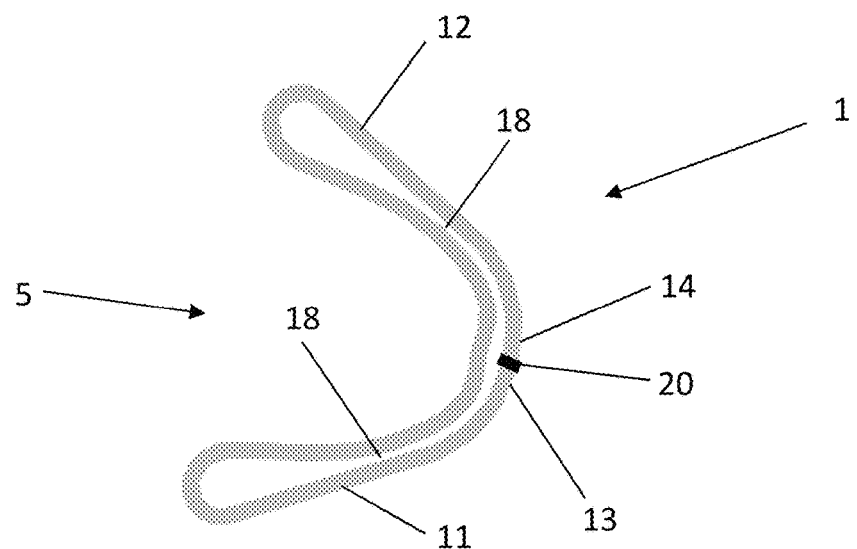
FIG. 6: shows a cross-sectional representation of the torsional profile in FIG. 5 in the region of the trough.

The depiction in FIG. 6 shows a cross section through the torsional profile 1 in FIG. 5 in the region of the trough 5. What can clearly be seen in this case is the air gap 18 that is formed between the legs 11, 12 and the walls of the trough 5, through which contact between the legs 11, 12 and the walls of the trough 5 and therefore subsequently noise generation through a rubbing of the legs 11, 12 against one another and the walls of the trough 5 is prevented. Furthermore, the joining seam 20 between the longitudinal edges 13, 14 of the legs 11, 12 can also be seen. List of reference numbers
1 Torsional profile
2 Plate
3 Sheet metal
4 Longitudinal plate direction
5 Trough
6 Length portion
7 Distance
8 Distance
9 Front edge
10 Front edge
11 Leg
12 Leg
13 Longitudinal edge
14 Longitudinal edge
15 Profile
16 Hollow profile
17 Longitudinal gap
18 Air gap
19 Ledge
20 Joining seam

What is claimed is:

1. A method for producing a bent torsional profile, the method comprising the following process steps:
    providing a plate made of planar sheet metal with two front edges that are arranged such that a first front edge of the two front edges and a second front edge of the two front edges each extend in a direction that converges to an acute angle with respect to one another;
    reshaping of the plate through an introduction of a bent trough oriented in a longitudinal direction of the plate in a central length portion of the plate at a distance from the two front edges of the plate, forming legs between the bent trough and longitudinal edges of the plate;
    reshaping of the legs in such a manner that an open profile is created;
    reshaping of the legs in such a manner that a hollow profile is produced, wherein a longitudinal gap is formed between the legs over an entire longitudinal extent thereof, and wherein an air gap is created between the legs and the bent trough in a region of the bent trough; and
    joining of the legs over an entire length of the longitudinal gap,
    wherein the longitudinal edges of the provided plate have essentially parallel bends,
    wherein a first end of the first front edge is directly connected to a first end of a first longitudinal edge of the longitudinal edges,
    wherein a second end of the first front edge is directly connected to a first end of a second longitudinal edge of the longitudinal edges,
    wherein a first end of the second front edge is directly connected to a second end of the first longitudinal edge, and
    wherein a second end of the second front edge is directly connected to a second end of the second longitudinal edge.

2. The method as claimed in claim 1, wherein the parallel bends of the longitudinal edges of the plate correspond to a bend of the bent trough.

3. The method as claimed in claim 2, wherein the longitudinal edges of the plate are provided with the bend before the provision of the plate or before the first reshaping of the plate.

4. The method as claimed in claim 1, wherein the plate, when reshaped to create the open profile, is reshaped such that the open profile has a roughly w- or M-shape in the central length portion and a roughly u- or n-shape between the two front edges and the bent trough.

5. The method as claimed in claim 1, wherein the plate or the open profile, when reshaped to create the hollow profile, is reshaped such that a butt joint or an overlap joint is produced between the legs on the longitudinal edges, on which the longitudinal gap is formed, thereby creating the hollow profile.

6. The method as claimed in claim 1, wherein the plate or else the open profile, when reshaped to create the hollow profile, is reshaped such that the hollow profile has a roughly V-shape in the central length portion and a roughly O-shape in portions between the bent trough and the two front edges.

7. The method as claimed in claim 1, wherein the introduction of the bent trough takes place using at least one of deep-drawing, stretch-forming, or embossing-raising.

8. The method as claimed in claim 1, wherein the plate is made of steel.

9. The method as claimed in claim 1, wherein the joining of the legs over the entire length of the longitudinal gap takes place by welding, soldering, adhesion or by a mechanical joining process.

10. The method as claimed in claim 1, wherein a torsional profile is produced.

11. The method as claimed in claim 1, wherein the plate is made of a high-strength or maximum-strength steel.

12. The method as claimed in claim 1, wherein the legs are formed between the bent trough and the longitudinal edges of the plate.

13. The method as claimed in claim 2, wherein the plate, when reshaped to create the open profile, is reshaped such that the open profile has a roughly w- or M-shape in the central length portion and a roughly u- or n-shape between the two front edges and the bent trough.

14. The method as claimed in claim 2, wherein the plate or the open profile, when reshaped to create the hollow profile, is reshaped such that a butt joint or an overlap joint is produced between the legs on the longitudinal edges, on which the longitudinal gap is formed, thereby creating the hollow profile.

15. The method as claimed in claim 2, wherein at least one of deep-drawing, stretch-forming, or embossing-raising is used to introduce the bent trough.

16. The method as claimed in claim 2, wherein the plate is made of steel.

17. The method as claimed in claim 2, wherein at least one of welding, soldering, or adhesion is used to join the legs over the entire length of the longitudinal gap.

18. The method as claimed in claim 2, wherein the plate comprises high-strength or maximum-strength steel.

19. The method as claimed in claim 2, wherein the legs are formed between the bent trough and the longitudinal edges of the plate.

20. The method as claimed in claim 1, wherein an entirety of the first front edge lies on a first line, and wherein an entirety of the second front edge lies on a second line.

* * * * *